(12) United States Patent
Xu et al.

(10) Patent No.: US 12,078,822 B2
(45) Date of Patent: Sep. 3, 2024

(54) LIGHT-SHIELDING ELEMENT AND OPTICAL IMAGING LENS APPLYING THE SAME

(71) Applicant: GENIUS ELECTRONIC OPTICAL (XIAMEN) CO., LTD., Fujian (CN)

(72) Inventors: Ziwen Xu, Fujian (CN); Guangwei Fu, Fujian (CN); Yiqun Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 637 days.

(21) Appl. No.: 17/344,992

(22) Filed: Jun. 11, 2021

(65) Prior Publication Data

US 2022/0317344 A1  Oct. 6, 2022

(30) Foreign Application Priority Data

Mar. 31, 2021  (CN) .......................... 202110351363.X

(51) Int. Cl.
*G02B 5/00* (2006.01)
*G02B 3/04* (2006.01)

(52) U.S. Cl.
CPC .............. *G02B 5/003* (2013.01); *G02B 3/04* (2013.01)

(58) Field of Classification Search
CPC .......... G02B 5/003; G02B 5/005; G02B 3/04; G02B 7/021; G02B 7/00; G02B 13/002; G03B 11/04
USPC ....................................................... 359/601
See application file for complete search history.

(56) References Cited

U.S. PATENT DOCUMENTS

| | | | | |
|---|---|---|---|---|
| 5,051,765 A | * | 9/1991 | Yoshizaki | G03B 17/04 396/448 |
| 5,159,372 A | * | 10/1992 | Nomura | G03B 17/04 396/448 |
| 10,054,756 B2 | * | 8/2018 | Wei | G02B 7/021 |
| 2018/0017753 A1 | * | 1/2018 | Wei | G02B 7/022 |
| 2018/0196171 A1 | * | 7/2018 | Hsu | G02B 5/005 |

(Continued)

FOREIGN PATENT DOCUMENTS

| | | |
|---|---|---|
| CN | 206339733 | 7/2017 |
| CN | 206515587 | 9/2017 |

(Continued)

OTHER PUBLICATIONS

"Office Action of China Counterpart Application", issued on Jan. 9, 2024, p. 1-p. 8.

*Primary Examiner* — William R Alexander
(74) *Attorney, Agent, or Firm* — JCIPRNET

(57) ABSTRACT

A light-shielding element, including an object-side mechanical surface facing an object side, an image-side mechanical surface facing an image side, an inner-side surface facing an optical axis, and an outer-side surface facing away from the inner-side surface. The light-shielding element further includes at least one cut. The at least one cut extends from the inner-side surface toward the outer-side surface and penetrates the object-side mechanical surface and the image-side mechanical surface. The inner-side surface surrounds the optical axis and forms a through hole. A contour of the through hole has a shortest distance D1 passing through the optical axis and a longest distance D2 passing through the optical axis. The light-shielding element satisfies the following conditional expression: $1.200 \leq D2/D1 \leq 3.000$. An optical imaging lens is also provided.

19 Claims, 14 Drawing Sheets

(56) References Cited

U.S. PATENT DOCUMENTS

| | | | | |
|---|---|---|---|---|
| 2020/0033513 A1* | 1/2020 | Wei | ........................ | G02B 5/005 |
| 2020/0348512 A1* | 11/2020 | Huang | ................ | G02B 27/0018 |
| 2020/0409142 A1* | 12/2020 | Feng | ....................... | G02B 7/021 |
| 2021/0063675 A1* | 3/2021 | Yang | ....................... | H04N 23/55 |
| 2022/0317410 A1* | 10/2022 | Yang | ....................... | G02B 7/003 |

FOREIGN PATENT DOCUMENTS

| | | | | |
|---|---|---|---|---|
| CN | 111190317 | | 5/2020 | |
| CN | 210572980 | | 5/2020 | |
| CN | 111751957 | | 10/2020 | |
| CN | 111856687 | | 10/2020 | |
| CN | 216310301 U * | | 4/2022 | ........... G02B 13/002 |
| IN | 4814MUM2015 | | 4/2017 | |
| JP | 2007334245 | | 12/2007 | |
| JP | 2009271187 | | 11/2009 | |
| JP | 2018054914 | | 4/2018 | |
| WO | WO-2013154121 A1 * | | 10/2013 | ........... C03B 11/082 |
| WO | WO-2019114513 A1 * | | 6/2019 | ............. G02B 7/021 |

\* cited by examiner

| Conditional Expression | First Group | Second Group | Third Group |
|---|---|---|---|
| D1 | 3.000 | 2.400 | 2.000 |
| D2 | 4.500 | 6.750 | 3.000 |
| D3 | 4.700 | 7.500 | 7.500 |
| D4 | 5.900 | 9.000 | 9.000 |
| L | 0.300 | 1.000 | 0.500 |
| W | 0.000 | 0.300 | 0.100 |
| DS1 | 0.850 | 2.000 | 3.260 |
| DS2 | 0.700 | 1.100 | 3.000 |
| T | 0.160 | 1.000 | 0.500 |
| D2/D1 | 1.500 | 2.813 | 1.500 |
| W/L | 0.000 | 0.300 | 0.200 |
| DS1/L | 2.833 | 2.000 | 6.520 |
| DS2/L | 2.333 | 1.100 | 6.000 |
| D3/D1 | 1.567 | 3.125 | 3.750 |
| (D3−D1)/(D3−D2) | 8.500 | 6.800 | 1.222 |
| D3/D4 | 0.797 | 0.833 | 0.833 |
| (D4−D3)/(D3+D4) | 0.113 | 0.091 | 0.091 |
| (D2−D1)/(D2+D1) | 0.200 | 0.475 | 0.200 |
| T/L | 0.533 | 1.000 | 1.000 |

FIG. 17

LIGHT-SHIELDING ELEMENT AND OPTICAL IMAGING LENS APPLYING THE SAME

CROSS-REFERENCE TO RELATED APPLICATION

This application claims the priority benefit of China application serial no. 202110351363. X, filed on Mar. 31, 2021. The entirety of the above-mentioned patent application is hereby incorporated by reference herein and made a part of this specification.

BACKGROUND

Technical Field

The disclosure relates to an optical element and an optical imaging lens, and in particular to a light-shielding element and an optical imaging lens using the light-shielding element.

Description of Related Art

In the existing optical imaging lens, in order to pursue better imaging quality, a light-shielding plate is used to block stray light to enter the image sensor. However, the image sensor has a design with the limitations of the long axis and the short axis. Generally, the conventional light-shielding plate has a contour of a regular circular through hole, which cannot effectively block stray light near the long axis region of the image sensor without affecting the passage of imaging rays. If only the inner edge aperture of the light-shielding plate is reduced, the light-shielding plate may easily interfere with adjacent optical elements during assembly, thereby affecting assembly yield and imaging quality.

SUMMARY

The disclosure provides a light-shielding element, which can achieve a better effect of shielding stray light in the case where a contour of a through hole has a better length ratio. The light-shielding element also includes at least one cut, which can effectively improve the issue of interference between the light-shielding element and adjacent optical elements.

The disclosure also provides an optical imaging lens using the light-shielding element. Therefore, the optical imaging lens has a better effect of shielding stray light and better assembly yield.

An embodiment of the disclosure provides a light-shielding element, which includes an object-side mechanical surface facing an object side, an image-side mechanical surface facing an image side, an inner-side surface facing an optical axis, and an outer-side surface facing away from the inner-side surface. The light-shielding element further includes at least one cut. The at least one cut extends from the inner-side surface toward the outer-side surface and penetrates the object-side mechanical surface and the image-side mechanical surface. The inner-side surface surrounds the optical axis and forms a through hole. A contour of the through hole has a shortest distance D1 passing through the optical axis and a longest distance D2 passing through the optical axis. The light-shielding element satisfies the following conditional expression:

$1.200 \leq D2/D1 \leq 3.000$.

An embodiment of the disclosure provides an optical imaging lens, which includes multiple lens elements and a light-shielding element. The light-shielding element includes an object-side mechanical surface facing an object side, an image-side mechanical surface facing an image side, an inner-side surface facing an optical axis, and an outer-side surface facing away from the inner-side surface. The light-shielding element further includes at least one cut. The at least one cut extends from the inner-side surface toward the outer-side surface and penetrates the object-side mechanical surface and the image-side mechanical surface. The inner-side surface surrounds the optical axis and forms a through hole. A contour of the through hole has a shortest distance D1 passing through the optical axis and a longest distance D2 passing through the optical axis. A periphery region of an image-side surface of a lens element in a first order counted from the light-shielding element to the object side is convex or a periphery region of an object-side surface of a lens element in a first order counted from the light-shielding element to the image side is convex. The image-side surface is a surface of a lens element facing the image side and allowing imaging rays to pass through, and the object-side surface is a surface of a lens element facing the object side and allowing the imaging rays to pass through. The optical imaging lens satisfies the following conditional expression: $0.100 \leq (D2-D1)/(D2+D1) \leq 0.950$.

Based on the above, the effects of the light-shielding element and the optical imaging lens according to the embodiments of the disclosure are: the contour of the through hole of the light-shielding element has a better length ratio to achieve a better effect of shielding stray light. In addition, the light-shielding element includes the at least one cut, which may provide the light-shielding element with a greater degree of freedom of movement to ensure that the issue of interference between the light-shielding element and the adjacent optical elements can be improved while achieving a better effect of shielding stray light. Therefore, the optical imaging lens using the light-shielding element has a better effect of shielding stray light and better assembly yield.

BRIEF DESCRIPTION OF THE DRAWINGS

FIG. 17 shows values of important parameters and relational expressions thereof of the light-shielding element according to the first embodiment of the disclosure.

DETAILED DESCRIPTION OF DISCLOSED EMBODIMENTS

The terms "optical axis region", "periphery region", "concave", and "convex" used in this specification and claims should be interpreted based on the definition listed in the specification by the principle of lexicographer.

Figure 1:
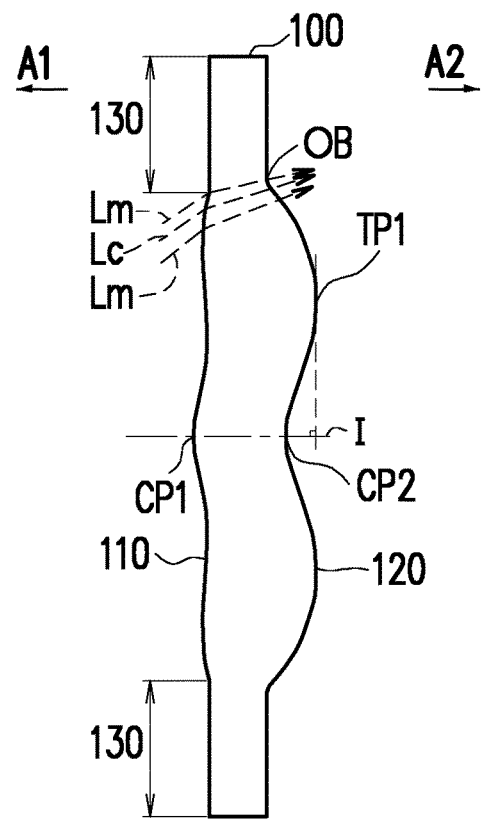
FIG. 1 is a schematic view of a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
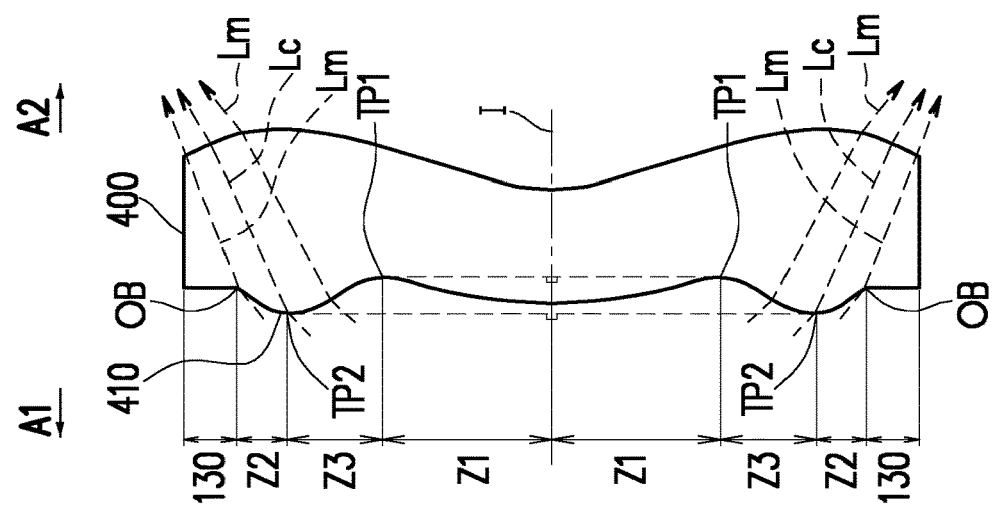
FIG. 4 is a schematic view of a surface structure of a lens element according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
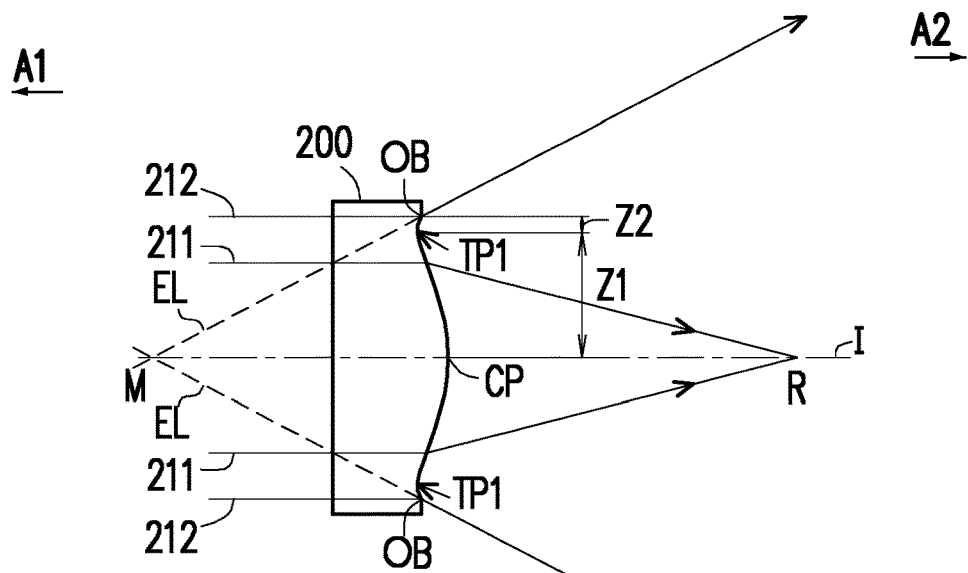
FIG. 2 is a schematic view of a surface concave-convex structure of a lens element and focal points of rays.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
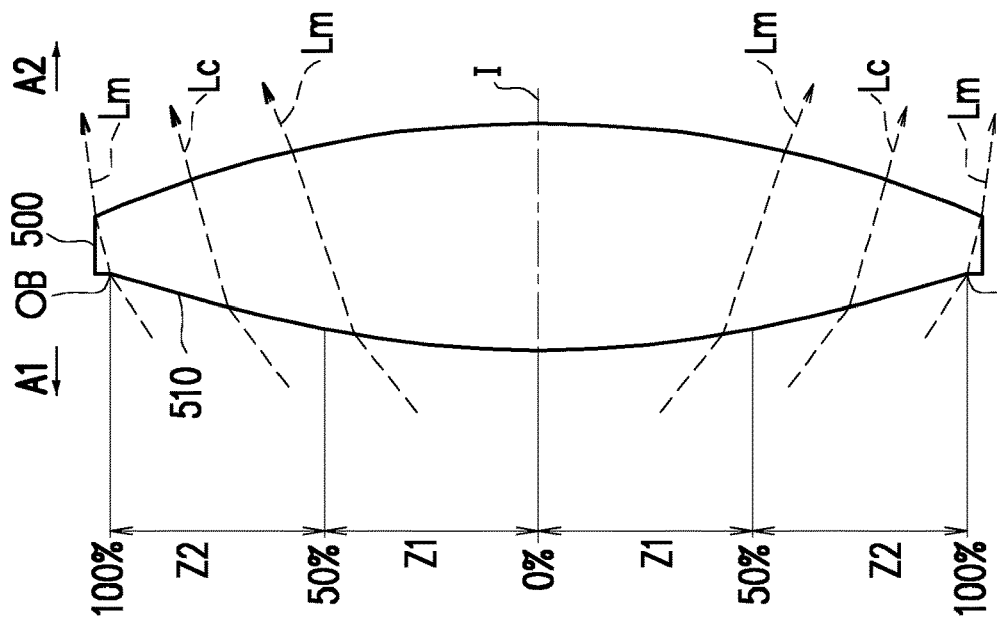
FIG. 5 is a schematic view of a surface structure of a lens element according to Example 3.
Figure 3:
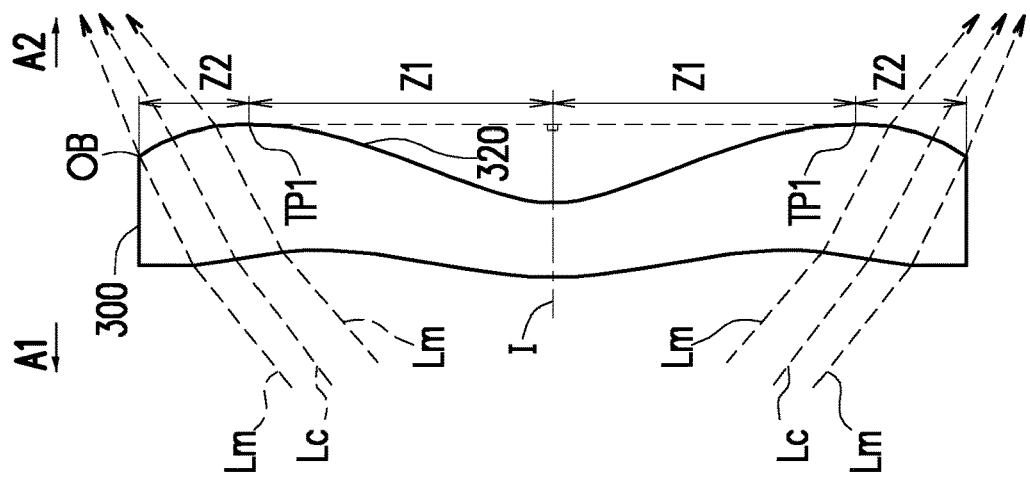
FIG. 3 is a schematic view of a surface structure of a lens element according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
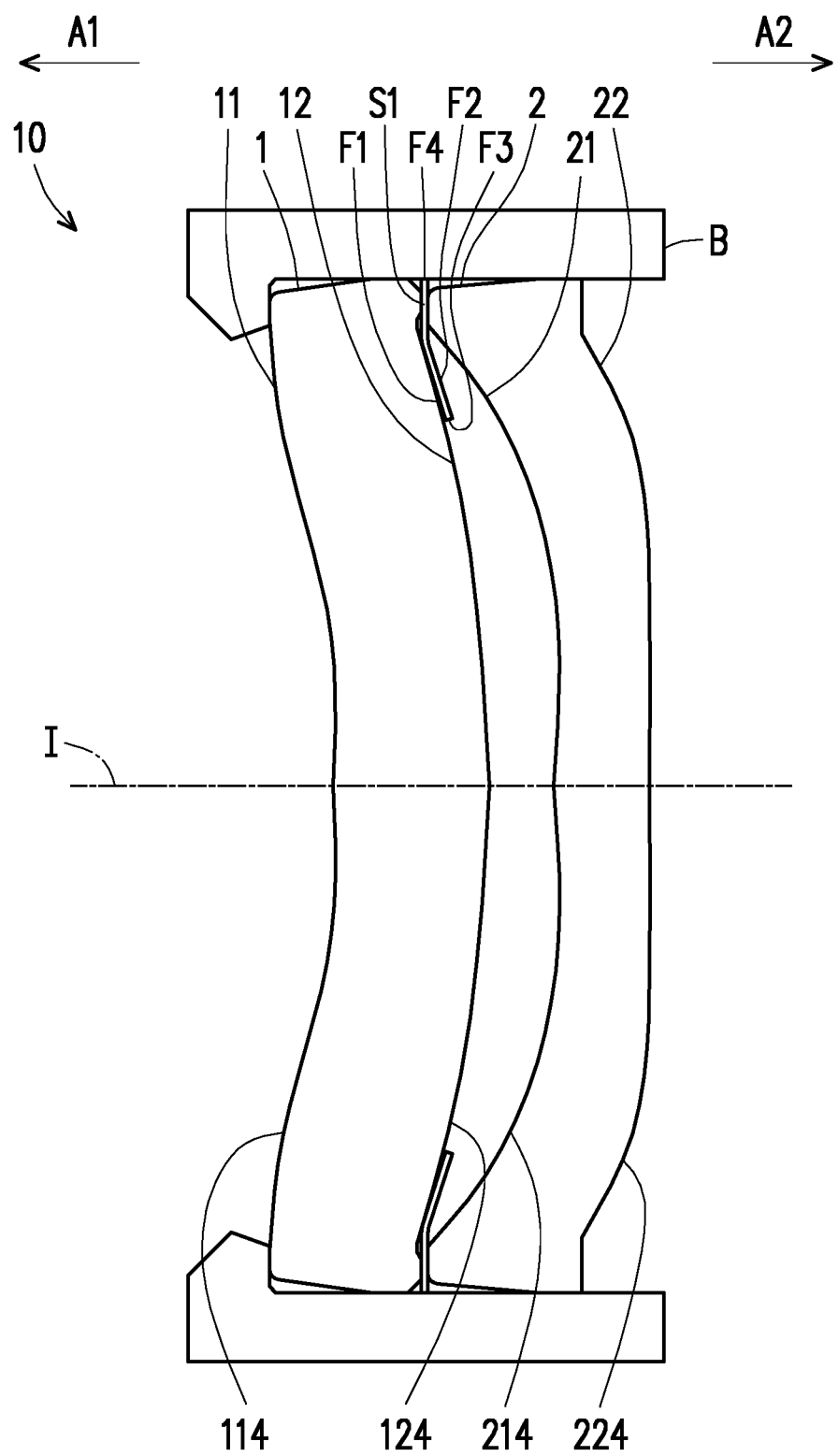
FIG. 6 is a schematic view of an optical imaging lens according to an embodiment of the disclosure.
Figure 7:
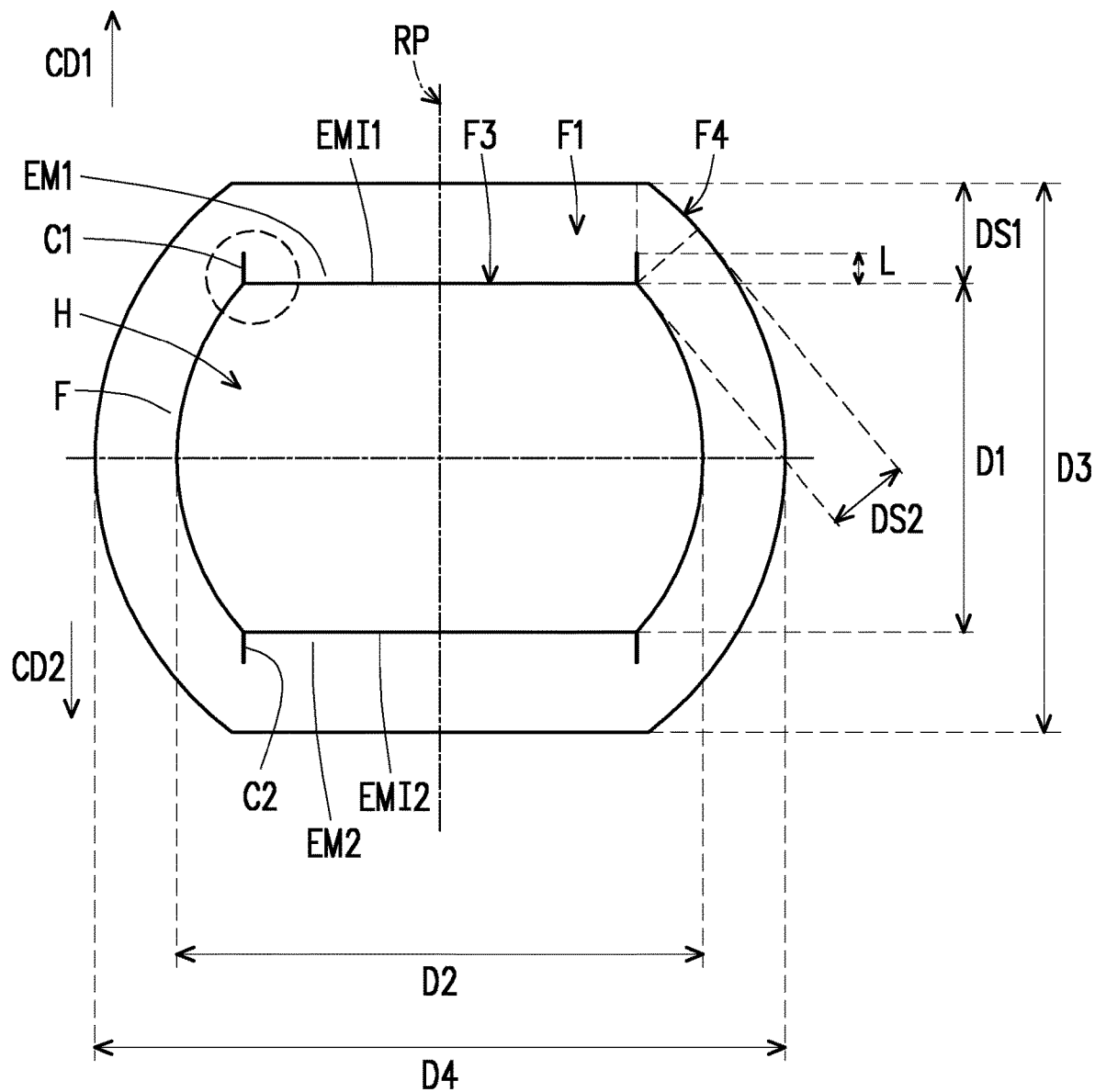
FIG. 7 is a schematic view of a light-shielding element according to a first embodiment of the disclosure.
Figure 8:
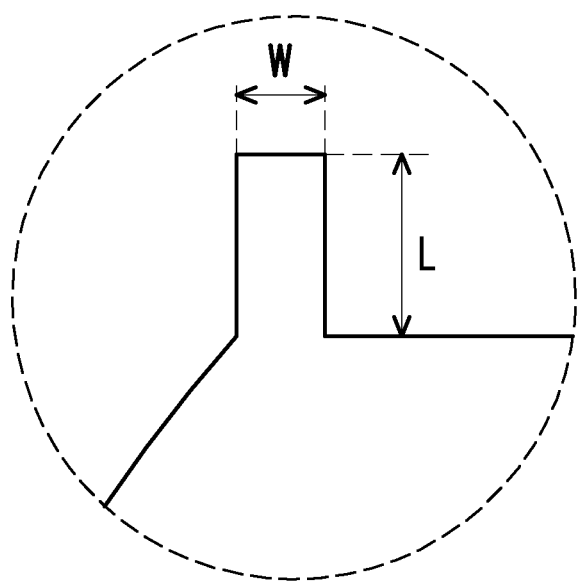
FIG. 8 shows schematic views of a partial enlarged view of the light-shielding element according to the first embodiment of the disclosure and the partial enlarged view at a different viewing angle.
Figure 8:
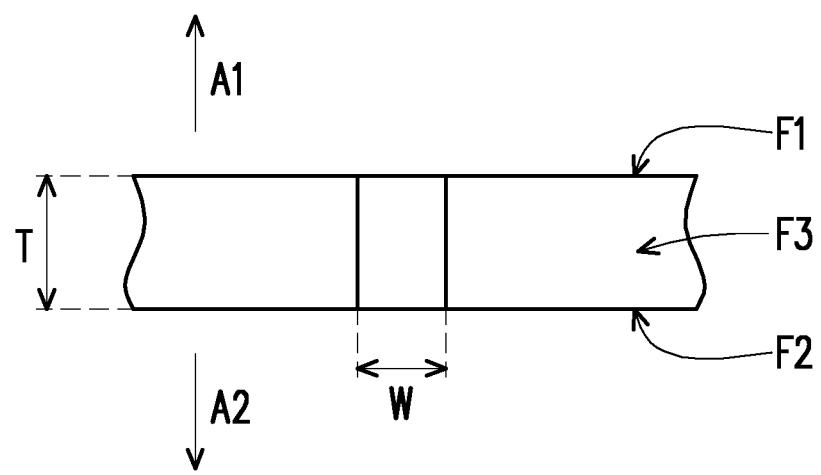

FIG. 6 is a schematic view of an optical imaging lens according to an embodiment of the disclosure. FIG. 7 is a schematic view of a light-shielding element according to a first embodiment of the disclosure. FIG. 8 shows schematic views of a partial enlarged view of the light-shielding element according to the first embodiment of the disclosure and the partial enlarged view at a different viewing angle. Please refer to FIG. 6 first. An optical imaging lens 10 according to an embodiment of the disclosure includes a first lens element 1, a light-shielding element S1, and a second lens element 2 from an object side A1 to an image side A2 along an optical axis I of the optical imaging lens 10. It is supplemented that the object side A1 is a side facing an object to be shot, and the image side A2 is a side facing an image plane.

In this embodiment, the first lens element 1 and the second lens element 2 of the optical imaging lens 10 respectively include object-side surfaces 11 and 21 facing the object side A1 and allowing imaging rays to pass through, and image-side surfaces 12 and 22 facing the image side A2 and allowing the imaging rays to pass through.

In this embodiment, the material of the first lens element 1 may be plastic or glass. The first lens element 1 is a lens element in a first order counted from the light-shielding element S1 to the object side A1. The object-side surface 11 and the image-side surface 12 of the first lens element 1 may be spherical surfaces or aspheric surfaces. FIG. 6 shows that a periphery region 114 of the object-side surface 11 of the first lens element 1 is concave, and a periphery region 124 of the image-side surface 12 is convex, but the disclosure does not limit the surface shape of the first lens element 1.

In this embodiment, the material of the second lens element 2 may be plastic or glass. The second lens element 2 is a lens element in a first order counted from the light-shielding element S1 to the image side A2. The object-side surface 21 and the image-side surface 22 of the second lens element 2 may be spherical surfaces or aspheric surfaces. FIG. 6 shows that a periphery region 214 of the object-side surface 21 of the second lens element 2 is concave, and a periphery region 224 of the image-side surface 22 is convex, but the disclosure does not limit the surface shape of the second lens element 2.

Please refer to FIG. 6, FIG. 7, and FIG. 8. In this embodiment, the light-shielding element S1 includes an object-side mechanical surface F1 facing the object side A1, an image-side mechanical surface F2 facing the image side A2, an inner-side surface F3 facing the optical axis I, and an outer-side surface F4 facing away from the inner-side surface F3. When the light-shielding element S1 abuts against an adjacent lens element, at least a portion of the surface of the object-side mechanical surface F1 or the image-side mechanical surface F2 is a surface for receiving a force. Therefore, the object-side mechanical surface F1 or the image-side mechanical surface F2 is a surface for receiving a bearing force.

In this embodiment, the light-shielding element S1 further includes at least one cut C1 and C2. The cuts C1 and C2 extends from the inner-side surface F3 toward the outer-side surface F4 and penetrates the object-side mechanical surface F1 and the image-side mechanical surface F2. The inner-side surface F3 surrounds the optical axis I and forms a through hole H. A contour of the through hole H has a shortest distance D1 passing through the optical axis I and a longest distance D2 passing through the optical axis I. In other words, the contour of the through hole H may be designed for a photosensitive region of an image sensor disposed on the image plane, so that a ratio of the shortest distance D1 to the longest distance D2 of the through hole H is close to a ratio of a short axis to a long axis of the photosensitive region of the image sensor, thereby providing a better effect of shielding stray light.

In this embodiment, the light-shielding element S1 further includes elastic movable parts EM1 and EM2, and a fixed part F adjacent to the elastic movable parts EM1 and EM2. The cuts C1 and C2 are respectively located between the elastic movable parts EM1 and EM2 and the fixed part F. In detail, the elastic movable parts EM1 and EM2 are adapted to generate elastic deformation. When the light-shielding element S1 abuts against an adjacent lens element, and when a periphery region of a surface on one side of the adjacent lens element abutting against the light-shielding element S1 is convex, the elastic movable part EM1 fits the surface of the lens element by elastic deformation to be attached to the lens element. In other words, the design of the cuts C1 and C2 or the elastic movable parts EM1 and EM2 provide a greater degree of freedom of movement to the light-shielding element S1. Therefore, when the light-shielding element S1 according to an embodiment of the disclosure is disposed between two adjacent lens elements, the light-shielding element S1 can achieve a better shielding effect of stray light while reducing interference with the adjacent optical elements.

In this embodiment, a periphery region of an image-side surface of a lens element in a first order counted from the light-shielding element S1 to the object side A1 among the lens elements in the optical imaging lens 10 is convex. The image-side surface is a surface of the lens element facing the image side A2 and allowing imaging rays to pass through.

In an embodiment, a periphery region of an object-side surface of a lens element in a first order counted from the light-shielding element S1 to the image side A2 among the lens elements in the optical imaging lens 10 is convex. The object-side surface is a surface of the lens element facing the object side A1 and allowing the imaging rays to pass through.

In addition, in this embodiment, as shown in FIG. 7, the elastic movable parts EM1 and EM2 have inner edges EMI1 and EMI2 closest to the optical axis I. The inner edges EMI1 and EMI2 are straight lines and have the advantages of easy processing and good shielding of stray light.

In this embodiment, the number of the cuts C1 and C2 of the light-shielding element S1 is greater than or equal to 1 and less than or equal to 8. FIG. 7 shows that the number of the cuts C1 and C2 of the light-shielding element S1 is 4, and the extension directions of the cuts C1 and C2 are respectively CD1 and CD2. In the labelling of FIG. 7, the cuts have the same extension direction, which is represented by one of the cuts. When the number of the cuts C1 and C2 is greater than or equal to 1 and less than or equal to 8, the objective of improving the issue of interference between the light-shielding element S1 and the adjacent lens element can be achieved without causing excessive light leakage and affecting imaging quality of the optical imaging lens 10 and the light-shielding element S1. The best configuration is that the number of the cuts C1 and C2 is greater than or equal to 2 and less than or equal to 4, which may maintain the optimal structural strength of the light-shielding element S1.

In this embodiment, as shown in FIG. 6, the optical imaging lens 10 further includes a lens barrel B. The first lens element 1, the second lens element 2, and the light-shielding element S1 are all disposed in the lens barrel B. Moreover, the lens barrel B is configured to fix the first lens element 1, the second lens element 2, and the light-shielding element S1 at designed positions.

In addition, the relationship between important parameters in the optical imaging lens 10 or the light-shielding element S1 according to the first embodiment is shown in FIG. 17. In order to further enable the optical imaging lens 10 or the light-shielding element S1 to have a better effect of shielding stray light while reducing interference with the optical elements, when the numerical limits of the following conditional expressions are satisfied, the embodiments of the disclosure have better effects.

In this embodiment, the extension lines of the cuts C1 and C2 of the light-shielding element S1 are parallel to a reference plane RP. The reference plane RP is a plane including the extension line of the shortest distance D1 and the optical axis I. Since the extension lines of the cuts C1 and C2 of the light-shielding element S1 are parallel to the reference plane RP, there are advantages of easy processing and no leakage of stray light when the elastic movable part EM1 of the light-shielding element S1 fits the lens element.

In this embodiment, the light-shielding element S1 further satisfies the following conditional expression: $0.000 \leq W/L \leq 1.000$, where L is the length of the cuts C1 and C2 on the object-side mechanical surface F1 or the image-side mechanical surface F2 in the extension directions CD1 and CD2 of the cuts C1 and C2 from the inner-side surface F3 toward the outer-side surface F4, and W is the width perpendicular to the extension directions CD1 and CD2. Since a cut with excessive width or unsuitable length will affect the light-shielding performance and the freedom of movement of the light-shielding element, when the light-shielding element S1 satisfies the above conditional expression, the light-shielding element S1 can have better effects of shielding and improving interference. A preferable range is $0.000 \leq W/L \leq 0.500$.

In this embodiment, the light-shielding element S1 further satisfies the following conditional expression: $1.500 \leq DS1/L \leq 25.000$, where DS1 is the distance from the inner-side surface F3 to the outer-side surface F4 at the positions of the cuts C1 and C2 in the extension directions CD1 and CD2 of the cuts C1 and C2 from the inner-side surface F3 toward the outer-side surface F4.

In this embodiment, the light-shielding element S1 further satisfies the following conditional expression: $1.100 \leq DS2/L \leq 20.000$, where DS2 is the shortest distance from the inner-side surface F3 to the outer-side surface F4 at the positions of the cuts C1 and C2. When the light-shielding element S1 satisfies the above conditional expression of $1.500 \leq DS1/L \leq 25.000$ or $1.100 \leq DS2/L \leq 20.000$, the light-shielding element S1 will not be easily broken due to the design of the cuts C1 and C2 while maintaining a good effect of shielding stray light. Preferable ranges are $2.500 \leq DS1/L \leq 7.000$ and $2.000 \leq DS2/L \leq 6.500$.

In this embodiment, the light-shielding element S1 further satisfies the following conditional expression: $1.100 \leq D3/D1 \leq 20.000$, where the outer-side surface F4 of the light-shielding element S1 has a shortest distance D3 passing through the optical axis I.

In this embodiment, the light-shielding element S1 further satisfies the following conditional expression: $0.050 \leq (D3-D1)/(D3-D2) \leq 30.000$.

In this embodiment, the light-shielding element S1 further satisfies the following conditional expression: $0.600 \leq D3/D4 \leq 1.000$, where the outer-side surface F4 of the light-shielding element S1 has a longest distance D4 passing through the optical axis I.

In this embodiment, the light-shielding element S1 further satisfies the following conditional expression: $0.010 \leq (D4-D3)/(D3+D4) \leq 0.950$. When the light-shielding element S1 satisfies the above conditional expression of $1.100 \leq D3/D1 \leq 20.000$, $0.050 \leq (D3-D1)/(D3-D2) \leq 30.000$, $0.600 \leq D3/D4 \leq 1.000$, or $0.010 \leq (D4-D3)/(D3+D4) \leq 0.950$, or other better configuration, considering the size of the image sensor and the necessity to maintain a high production yield of the light-shielding element S1, the light-shielding element S1 can also have a good effect of shielding stray light. Preferable ranges are $1.100 \leq D3/D1 \leq 4.000$, $1.000 \leq (D3-D1)/(D3-D2) \leq 9.000$, and $0.050 \leq (D4-D3)/(D3+D4) \leq 0.300$.

In this embodiment, the light-shielding element S1 further satisfies the following conditional expression: $0.150 \leq T/L \leq 3.500$, where T is the minimum thickness of the light-shielding element S1 along the optical axis I, so that when the light-shielding element S1 abuts against the adjacent optical element, the light-shielding element S1 has a suitable degree of freedom of movement and the issue of interference is improved. A preferable range is $0.500 \leq T/L \leq 1.000$.

Figure 9:
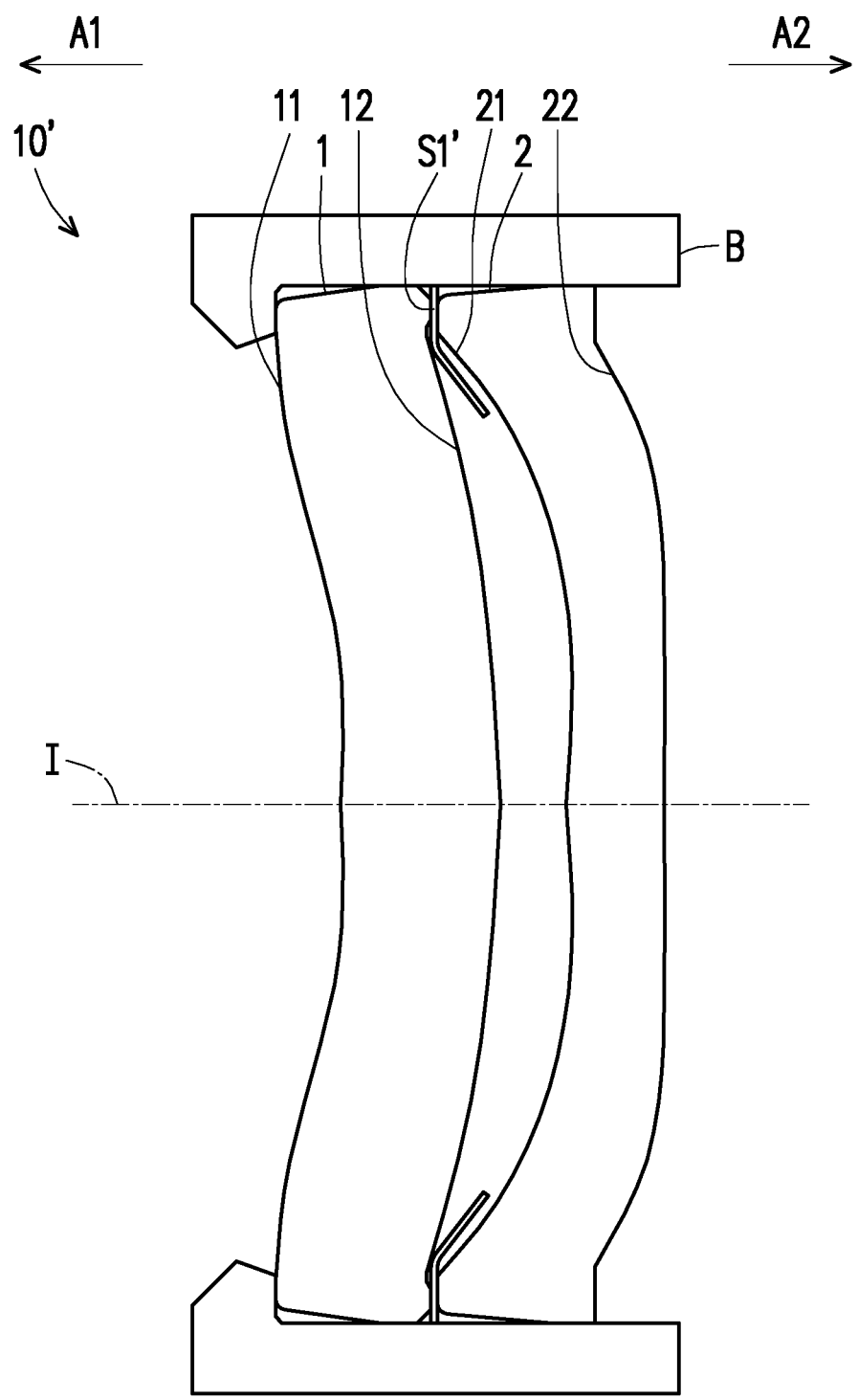
FIG. 9 shows a schematic view of interference between a light-shielding element and an adjacent lens element of an optical imaging lens according to a comparative embodiment.

FIG. 9 shows a schematic view of interference between a light-shielding element and an adjacent lens element of an optical imaging lens according to a comparative embodiment. Please refer to FIG. 9. The main differences between a light-shielding element S1' of the comparative embodiment and the light-shielding element S1 of FIG. 6 are that the light-shielding element S1' of an optical imaging lens 10' does not have any cut and a contour of a through hole of the light-shielding element S1' is circular. As shown in FIG. 9, since the light-shielding element S1' of the comparative example is not designed with a cut, when the contour of the through hole of the light-shielding element S1' is reduced to fit a photosensitive region of an image sensor, the light-shielding element S1' cannot completely abut against a surface of an adjacent lens element due to interference, resulting in the issue of warping of the light-shielding plate, thereby affecting assembly yield and imaging quality.

On the contrary, as shown in FIG. 6 and FIG. 7, in the optical imaging lens 10 or the light-shielding element S1 according to the first embodiment of the disclosure, since the light-shielding element S1 includes the cuts C1 and C2, the light-shielding element S1 may provide a greater degree of freedom of movement. Moreover, the contour of the through hole H of the light-shielding element S1 has a better length ratio, which ensures that the issue of interference between the light-shielding element S1 and the adjacent optical element (such as the lens element) can be improved while achieving a better effect of shielding stray light.

Figure 10:
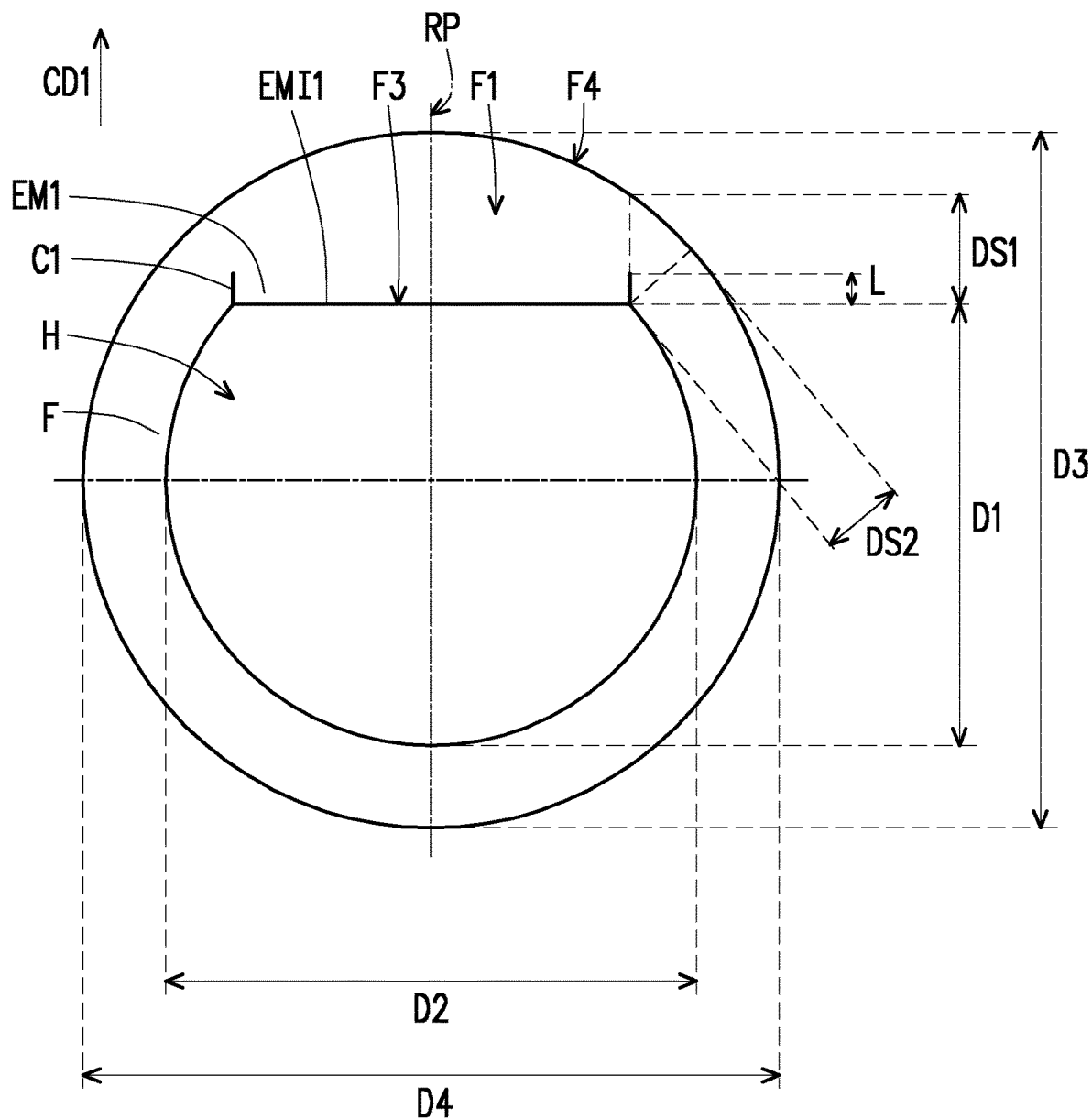
FIG. 10 is a schematic view of a light-shielding element according to a second embodiment of the disclosure.

FIG. 10 is a schematic view of a light-shielding element according to a second embodiment of the disclosure. Please refer to FIG. 10. A light-shielding element S2 of FIG. 10 is similar to the light-shielding element S1 of FIG. 7, and the main difference between the two is that the number of the cut C1 of the light-shielding element S2 is two. In addition, the contour of the outer-side surface F4 of the light-shielding element S2 is circular, that is, D3=D4. The contour of the through hole H of the light-shielding element S2 is mirror-symmetrical in the direction along the extension line of the shortest distance D1, but is asymmetrical in the direction along the extension line of the longest distance D2. The advantages of the light-shielding element S2 are similar to the light-shielding element S1, which will not be repeated here.

Figure 11:
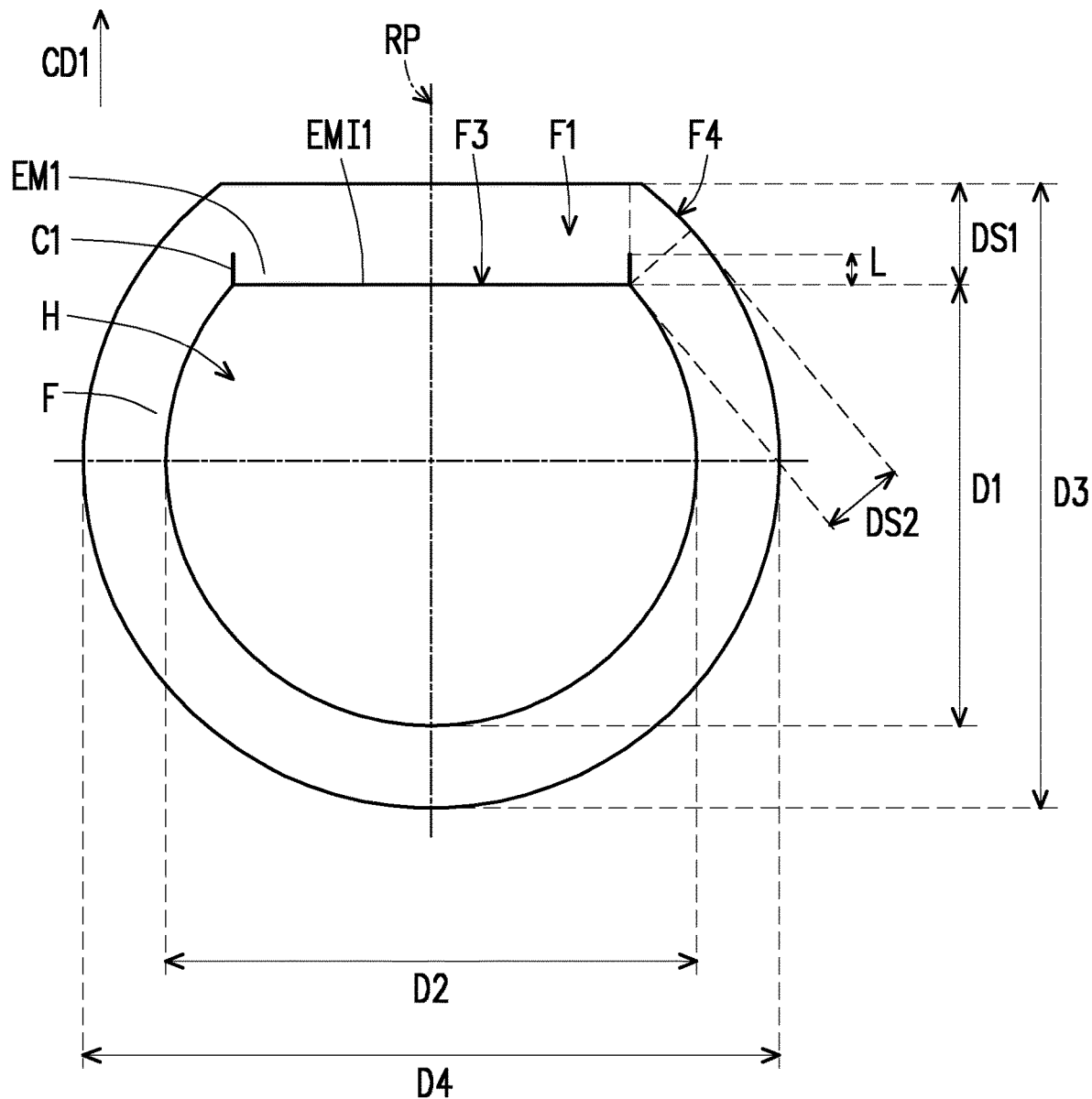
FIG. 11 is a schematic view of a light-shielding element according to a third embodiment of the disclosure.

FIG. 11 is a schematic view of a light-shielding element according to a third embodiment of the disclosure. Please refer to FIG. 11. A light-shielding element S3 of FIG. 11 is similar to the light-shielding element S2 of FIG. 10, and the main difference between the two is that the shortest distance D3 and the longest distance D4 of the outer-side surface F4 of the light-shielding element S3 passing through the optical axis I are not equal. The advantages of the light-shielding element S3 are similar to the light-shielding element S2, which will not be repeated here.

Figure 12:
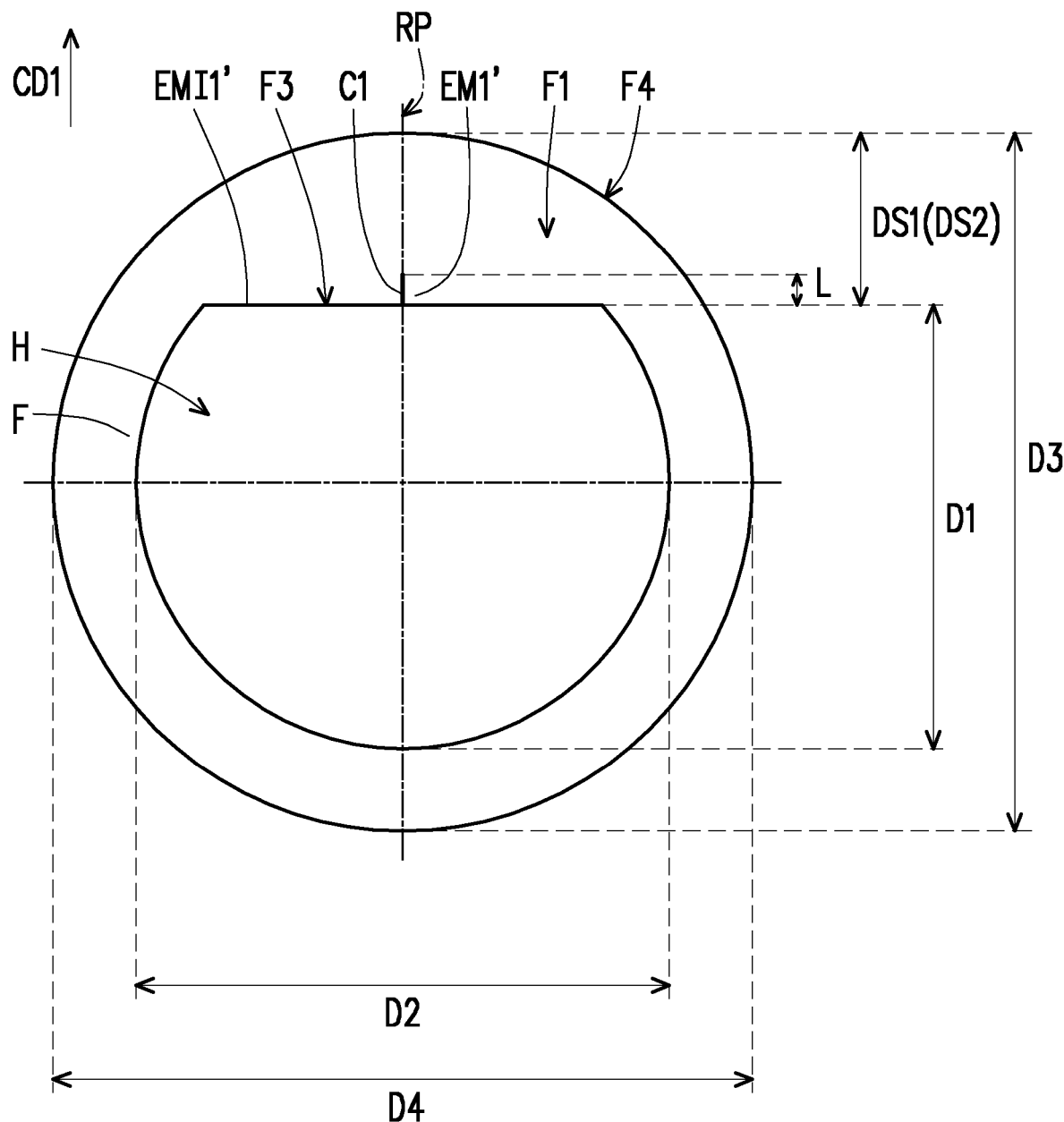
FIG. 12 is a schematic view of a light-shielding element according to a fourth embodiment of the disclosure.

FIG. 12 is a schematic view of a light-shielding element according to a fourth embodiment of the disclosure. Please refer to FIG. 12. A light-shielding element S4 of FIG. 12 is similar to the light-shielding element S2 of FIG. 10, and the main differences between the two are that the number of the cut C1 of the light-shielding element S4 is 1, the cut C1 is located in an elastic movable part EM1', and an inner edge EMI1' of the elastic movable part EM1' is a straight line. The advantages of the light-shielding element S4 are similar to the light-shielding element S2, which will not be repeated here.

Figure 13:
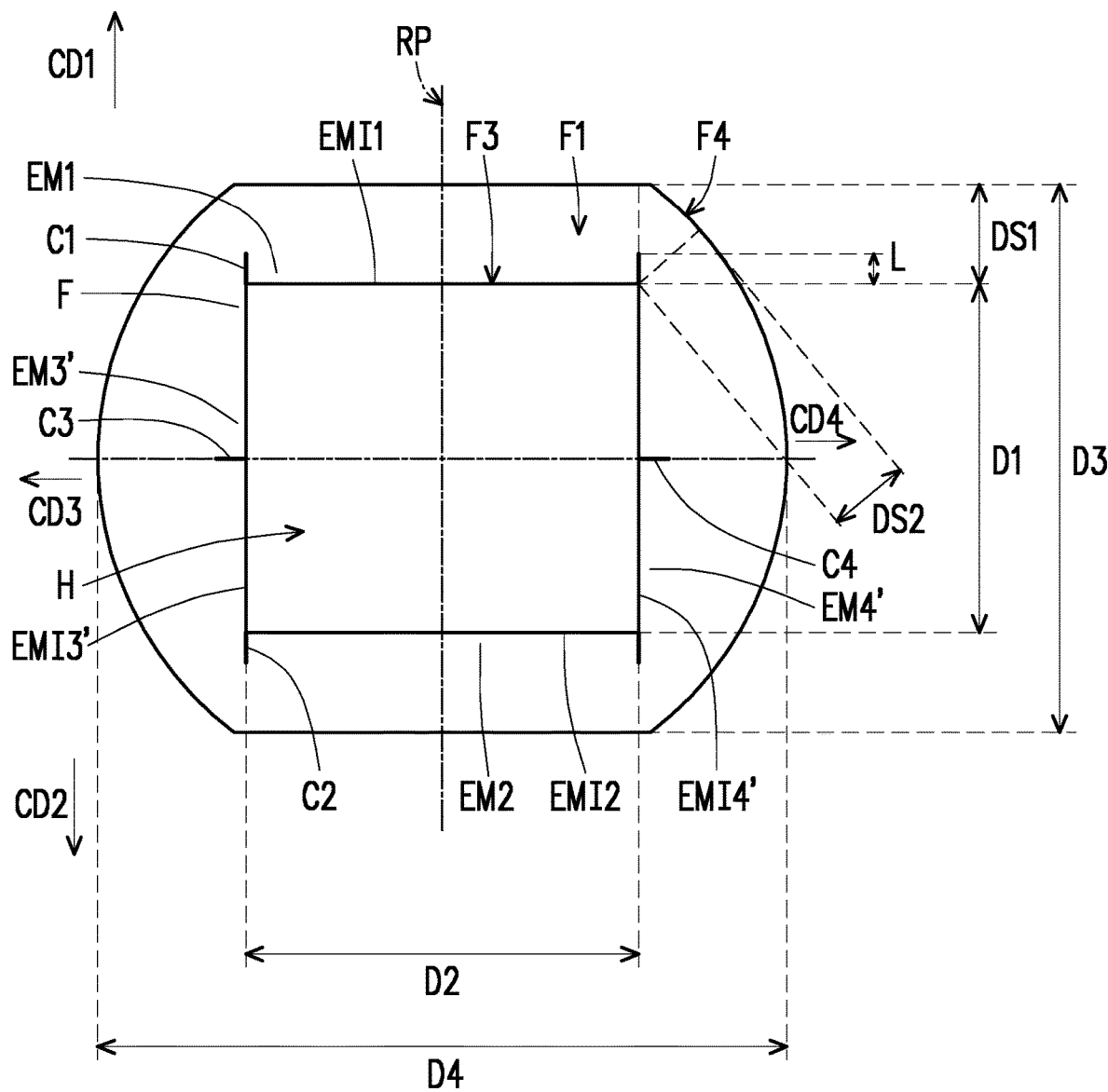
FIG. 13 is a schematic view of a light-shielding element according to a fifth embodiment of the disclosure.

FIG. 13 is a schematic view of a light-shielding element according to a fifth embodiment of the disclosure. Please refer to FIG. 13. A light-shielding element S5 of FIG. 13 is similar to the light-shielding element S1 of FIG. 7, and the main difference between the two is that the number of cuts C1, C2, C3, and C4 of the light-shielding element S5 is 6. Extension directions of the cuts C1, C2, C3, and C4 are respectively CD1, CD2, CD3, and CD4, the extension lines of the cuts C1 and C2 are parallel to the reference plane RP, and the extension lines of the cuts C3 and C4 are perpendicular to and the reference plane RP. In addition, another elastic movable part EM3' or EM4' is adjacent to the elastic movable part EM1 or EM2, the cuts C3 and C4 are respectively located in the elastic movable parts EM3' and EM4', and inner edges EMI3' and EMI4' of the elastic movable parts EM3' and EM4' are straight lines. The contour of the inner-side surface F3 of the light-shielding element S5 is rectangular. The advantages of the light-shielding element S5 are similar to the light-shielding element S1, which will not be repeated here.

Figure 14:
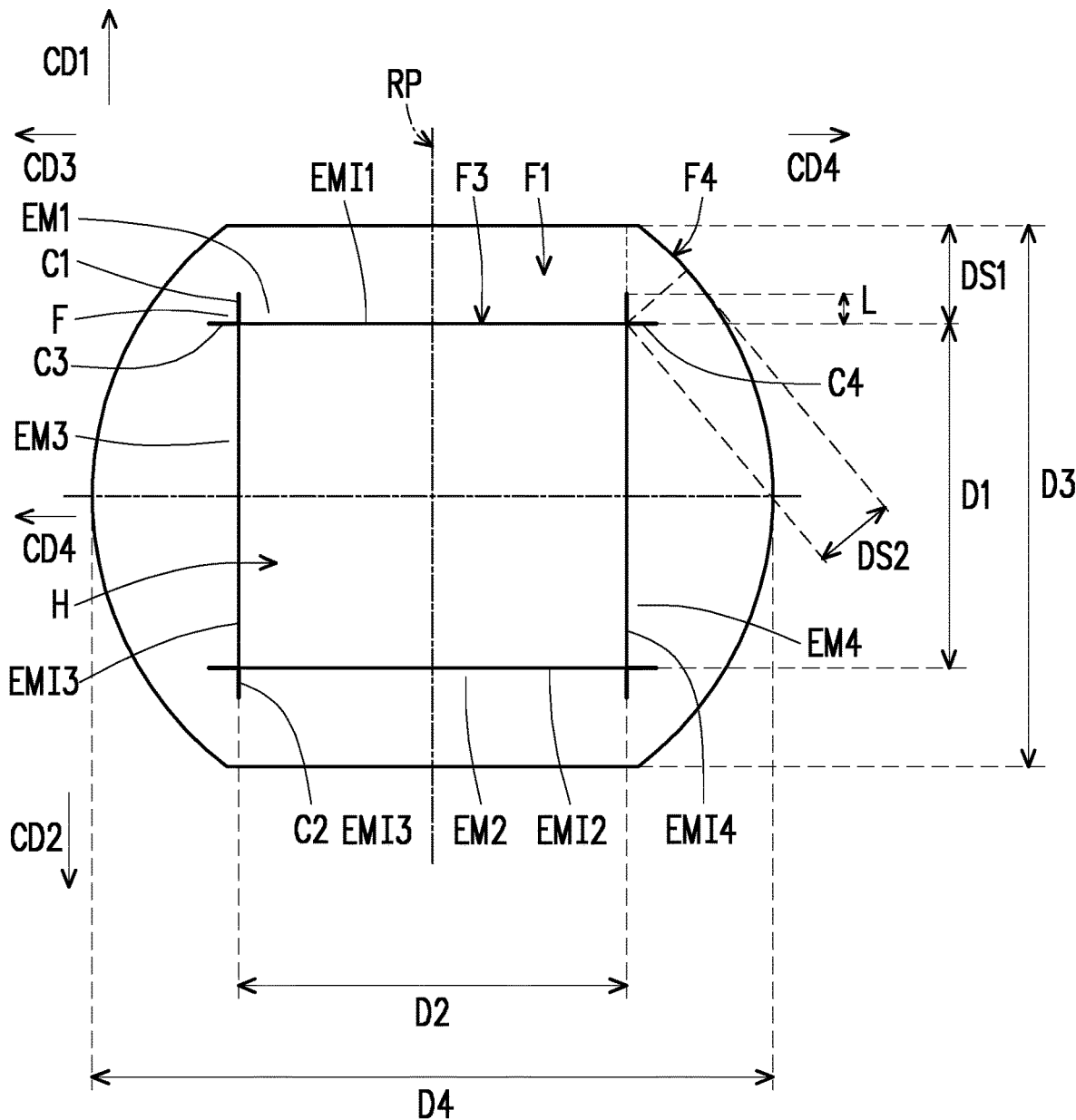
FIG. 14 is a schematic view of a light-shielding element according to a sixth embodiment of the disclosure.

FIG. 14 is a schematic view of a light-shielding element according to a sixth embodiment of the disclosure. Please refer to FIG. 14. A light-shielding element S6 of FIG. 14 is similar to the light-shielding element S5 of FIG. 13, and the main differences between the two are that the number of the cuts C1, C2, C3, and C4 of the light-shielding element S6 is 8, and the positions of the cuts are not exactly the same. The cuts C1 and C3 are located between the elastic movable part EM1 and the elastic movable part EM3, the cuts C3 and C2 are located between the elastic movable part EM3 and the elastic movable part EM2, the cuts C2 and C4 are located between the elastic movable part EM2 and the elastic movable part EM4, and the cuts C4 and C1 are located between the elastic movable part EM4 and the elastic movable part EM1. The extension directions of the cuts C1, C2, C3, and C4 are respectively CD1, CD2, CD3, and CD4. The advantages of the light-shielding element S6 are similar to the light-shielding element S5, which will not be repeated here.

Figure 15:
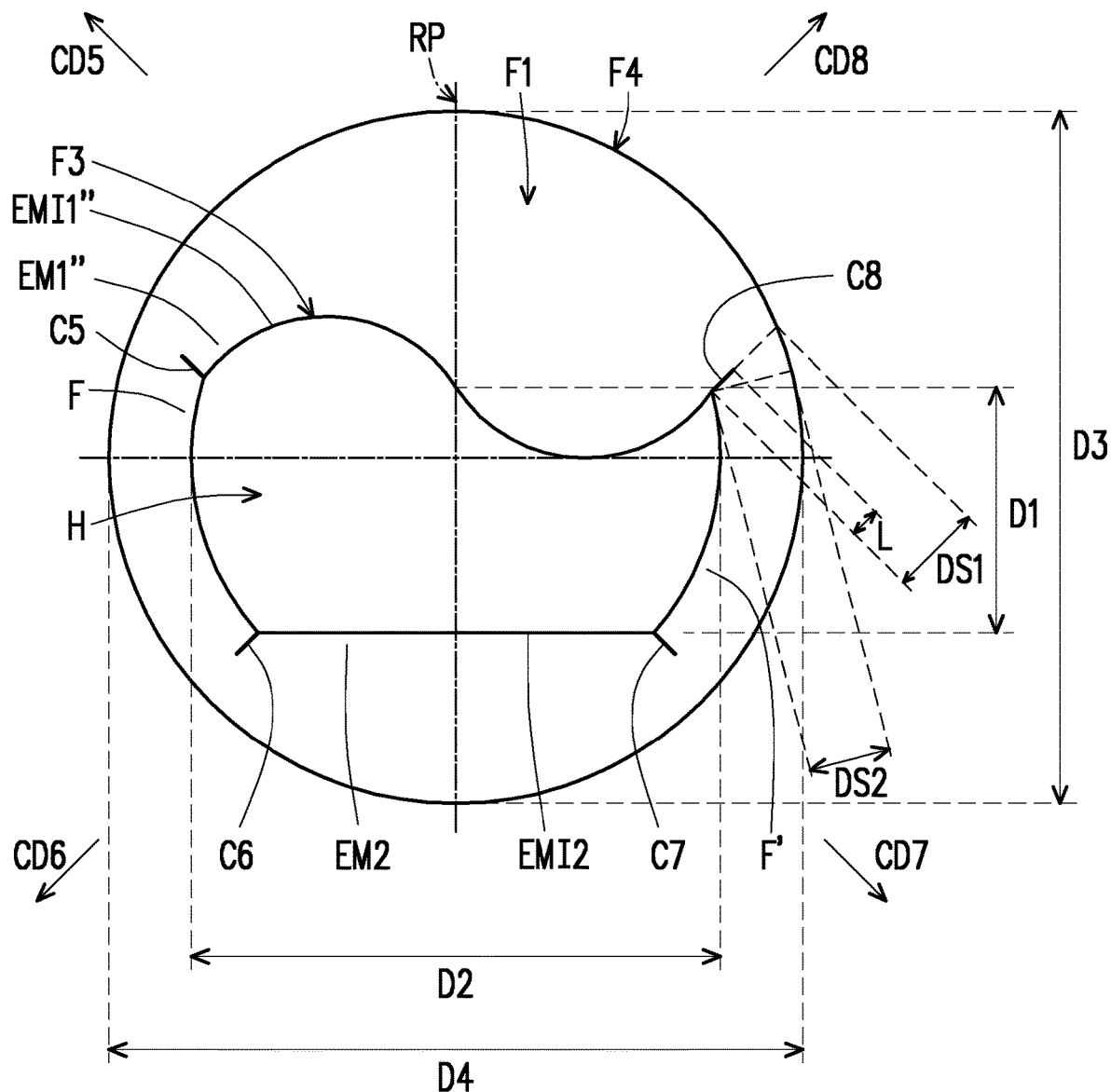
FIG. 15 is a schematic view of a light-shielding element according to a seventh embodiment of the disclosure.

FIG. 15 is a schematic view of a light-shielding element according to a seventh embodiment of the disclosure. Please refer to FIG. 15. A light-shielding element S7 of FIG. 15 is similar to the light-shielding element S1 of FIG. 7, and the main difference between the two is that the number of cuts C5, C6, C7, and C8 of the light-shielding element S7 is 4. Extension directions of the cuts C5, C6, C7, and C8 are respectively CD5, CD6, CD7, and CD8, and respectively have included angles greater than 0 degrees and less than 90 degrees with the reference plane RP. The reference plane RP is the plane including the extension line of the shortest distance D1 and the optical axis I. In addition, the cuts C5 and C8 are located between an elastic movable part EM1" and the fixed part F, and an inner edge EMI1" of the elastic movable part EM1" is S-shaped. The cuts CD6 and CD7 are respectively located between the elastic movable part EM2 and the fixed part F and between the elastic movable part EM2 and a fixed part F', and the inner edge EMI2 of the elastic movable part EM2 is a straight line. The cuts with suitable angles are selected in response to the inner edge EMI1" of the elastic movable part EM1" and the inner edge EMI2 of the elastic movable part EM2 of the light-shielding element S7, which is helpful to the effect of shielding stray light and improving the issue of interference. The advantages of the light-shielding element S7 are similar to the light-shielding element S1, and will not be repeated here.

Figure 16:
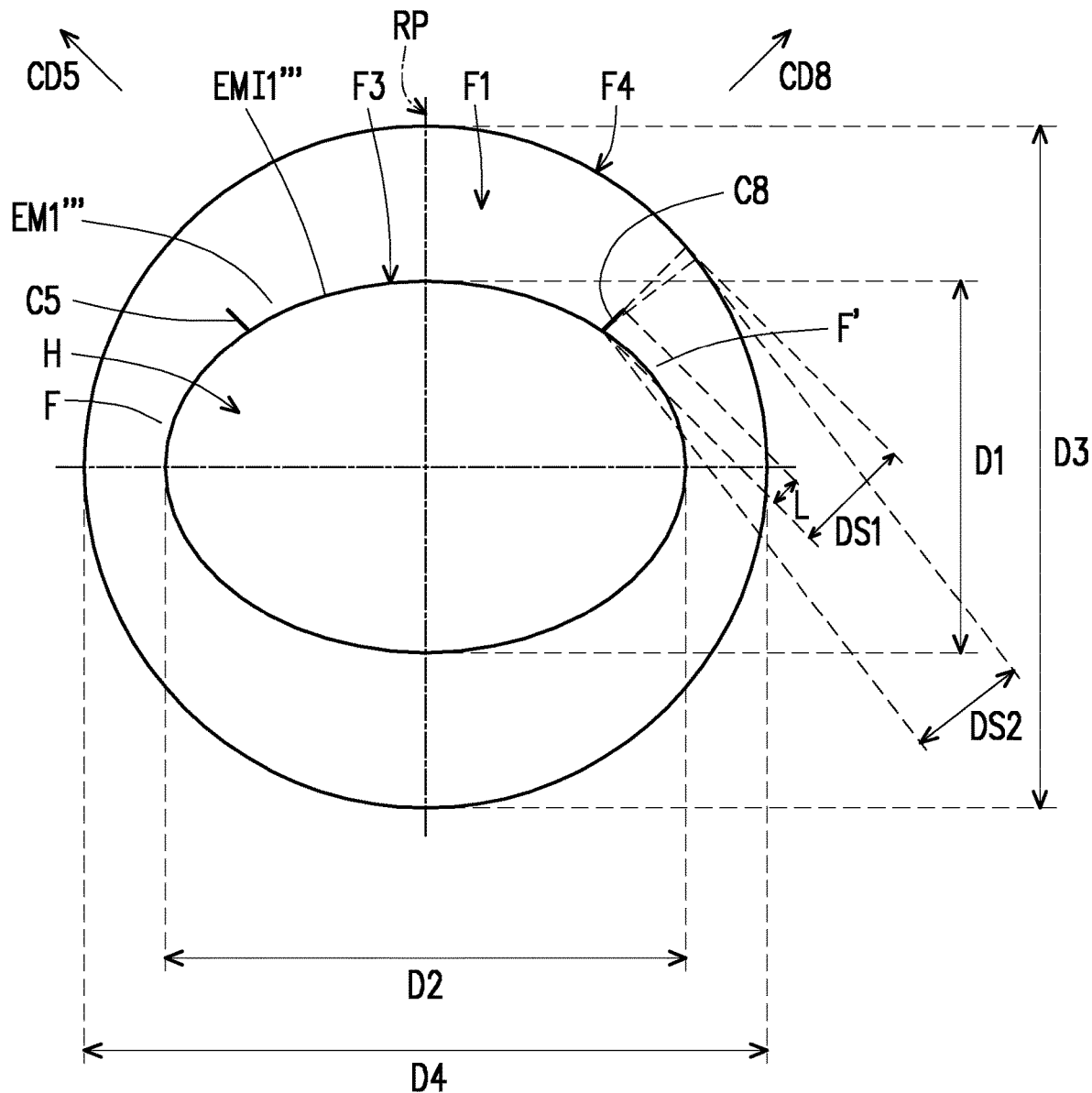
FIG. 16 is a schematic view of a light-shielding element according to an eighth embodiment of the disclosure.

FIG. 16 is a schematic view of a light-shielding element according to an eighth embodiment of the disclosure. Please refer to FIG. 16. A light-shielding element S8 of FIG. 16 is similar to the light-shielding element S1 of FIG. 7, and the main difference between the two is that the number of the cuts C5 and C8 of the light-shielding element S8 is 2. The extension directions of the cuts C5 and C8 are respectively CD5 and CD8, and respectively have included angles greater than 0 degrees and less than 90 degrees with the reference plane RP. The reference plane RP is the plane including the extension line of the shortest distance D1 and the optical axis I. In addition, the cuts CD5 and CD8 are respectively located between an elastic movable part EM1''' and the fixed part F and between the elastic movable part EM1''' and the fixed part F', and an inner edge EMI1''' of the elastic movable part EM1''' is arced. The cuts with suitable angles are selected in response to the inner edge EMI1''' of the elastic movable part EM1''' of the light-shielding element S8, which is helpful to the effect of shielding stray light and improving the issue of interference. The contour of the inner-side surface F3 of the light-shielding element S8 is elliptical. The advantages of the light-shielding element S8 are similar to the light-shielding element S1, which will not be repeated here.

In conjunction with FIG. 17, FIG. 17 shows values of important parameters and relational expressions thereof of the light-shielding element according to the first embodiment of the disclosure, where the unit of each distance is millimeter. The parameters of the first to third groups shown in FIG. 17 are all designed according to the first embodiment corresponding to different forms of image sensors, but the values of the parameters of the second to eighth embodiments may also fall within the preferable ranges of the disclosure. For example, in response to image sensors with different sizes, the contour of the outer-side surface F4 of the light-shielding element S2 in FIG. 10 is designed to be circular, but the contour of the inner-side surface F3 or the outer-side surface F4 of each light-shielding element should be determined according to design requirements.

In addition, any combination of the parameters of the embodiments may be selected to increase the limit of the optical imaging lens or the light-shielding element, so as to facilitate the design of the optical imaging lens or the light-shielding element with the same architecture as the disclosure.

In summary, the optical imaging lens or the light-shielding element according to the embodiments of the disclosure may obtain the following effects and advantages:

1. The optical imaging lens or the light-shielding element according to the embodiments of the disclosure satisfies the following conditional expression: $1.200 \leq D2/D1 \leq 3.000$. When the optical imaging lens or the light-shielding element according to the embodiments of the disclosure satisfies the conditional expression of $1.200 \leq D2/D1 \leq 3.000$, the stray light near the long axis region of the image sensor may be effectively shielded without affecting the imaging rays near the short axis region of the image sensor under the premise of the most cost-saving, so that the light-shielding element balances light transmission and light shielding by having the image sensor with the long and short axis design. Also, by fitting the cut that extends from the inner-side surface to the outer-side surface and penetrates the object-side mechanical surface and the image-side mechanical surface, a sufficient degree of freedom of movement may be effectively provided to the light-shielding element, thereby improving the issue of interference with the adjacent optical element (for example, the lens element) when assembling the light-shielding element, so as to improve assembly yield and maintain imaging quality.

2. The optical imaging lens or the light-shielding element according to the embodiments of the disclosure satisfies the following conditional expression: $0.100 \leq (D2-D1)/(D2+D1) \leq 0.950$. The distance passing through the optical axis of the contour of the through hole of the light-shielding element being too long or too short will affect the effect of shielding stray light. If the conditional expression of $0.100 \leq (D2-D1)/(D2+D1) \leq 0.950$ is satisfied, the stray light near the long axis region of the image sensor is effectively shielded without affecting the imaging rays near the short axis region of the image sensor under the premise of the most cost-saving. When the periphery region of the image-side surface of the lens element in a first order counted from the light-shielding element to the object side is convex or when the periphery region of the object-side surface of the lens element in a first order counted from the light-shielding element to the image side is convex, and the light-shielding element has the cut extending from the inner-side surface toward the outer-side surface and penetrating the object-side mechanical surface and the image-side mechanical surface, a sufficient degree of freedom of movement may be effectively provided to the light-shielding element, thereby improving the issue of interference with the adjacent optical element when assembling the light-shielding element, so as to improve assembly yield and maintain imaging quality.

The contents in the embodiments of the invention include but are not limited to a distance, a width, a thickness, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the disclosure has been disclosed in the above embodiments, the embodiments are not intended to limit the disclosure. Persons skilled in the art may make some changes and modifications without departing from the spirit and scope of the disclosure. The protection scope of the disclosure shall be defined by the appended claims.

What is claimed is:

1. A light-shielding element, configured to dispose in a lens barrel, and comprising an object-side mechanical surface facing an object side, an image-side mechanical surface facing an image side, an inner-side surface facing an optical axis, and an outer-side surface facing away from the inner-side surface;

the light-shielding element further comprising at least one cut, wherein the at least one cut extends from the inner-side surface toward the outer-side surface and penetrates the object-side mechanical surface and the image-side mechanical surface;

the inner-side surface surrounds the optical axis and forms a through hole, a contour of the through hole has a shortest distance D1 passing through the optical axis and a longest distance D2 passing through the optical axis; and the light-shielding element satisfies a following conditional expressions: $1.200 \leq D2/D1 \leq 3.000$ and $0.010 \leq (D4-D3)/(D3+D4) \leq 0.950$, where the outer-side surface of the light-shielding element has a shortest distance D3 passing through the optical axis, and the outer-side surface of the light-shielding element has a longest distance D4 passing through the optical axis.

2. The light-shielding element according to claim 1, wherein a number of the at least one cut is greater than or equal to 1 and less than or equal to 8.

3. The light-shielding element according to claim 1, wherein a reference plane comprising an extension line of the shortest distance D1 and the optical axis is defined, and an extension line of one of the at least one cut is parallel to the reference plane.

4. The light-shielding element according to claim 1, wherein a reference plane comprising an extension line of the shortest distance D1 and the optical axis is defined, and an extension line of one of the at least one cut is perpendicular to the reference plane.

5. The light-shielding element according to claim 1, wherein the light-shielding element further satisfies a following conditional expression: $0.000 \leq W/L \leq 1.000$, where L is a length of the at least one cut on the object-side mechanical surface or the image-side mechanical surface in an extension direction of the at least one cut from the inner-side surface toward the outer-side surface, and W is a width perpendicular to the extension direction.

6. The light-shielding element according to claim 1, wherein the light-shielding element further satisfies a following conditional expression: $1.500 \leq DS1/L \leq 25.000$, where DS1 is a distance from the inner-side surface to the outer-side surface at a position of the at least one cut in an extension direction of the at least one cut from the inner-side surface toward the outer-side surface, and L is a length of the at least one cut on the object-side mechanical surface or the image-side mechanical surface in an extension direction of the at least one cut from the inner-side surface toward the outer-side surface.

7. The light-shielding element according to claim 1, wherein the light-shielding element further satisfies a following conditional expression: $1.100 \leq DS2/L \leq 20.000$, where DS2 is a shortest distance from the inner-side surface to the outer-side surface at a position of the at least one cut, and L is a length of the at least one cut on the object-side mechanical surface or the image-side mechanical surface in an extension direction of the at least one cut from the inner-side surface toward the outer-side surface.

8. The light-shielding element according to claim 1, wherein the light-shielding element further satisfies a following conditional expression: $1.100 \leq D3/D1 \leq 20.000$.

9. The light-shielding element according to claim 1, wherein the light-shielding element further satisfies a following conditional expression: $0.050 \leq (D3-D1)/(D3-D2) \leq 30.000$.

10. The light-shielding element according to claim 1, wherein the light-shielding element further satisfies a following conditional expression: $0.600 \leq D3/D4 \leq 1.000$.

11. The light-shielding element according to claim 1, further comprising an elastic movable part and a fixed part adjacent to the elastic movable part, wherein the at least one cut is located between the elastic movable part and the fixed part.

12. The light-shielding element according to claim 1, further comprising an elastic movable part, wherein the elastic movable part has an inner edge closest to the optical axis, and the inner edge is a straight line.

13. The light-shielding element according to claim 1, further comprising an elastic movable part, wherein the at least one cut is located in the elastic movable part.

14. The light-shielding element according to claim 1, wherein the light-shielding element further satisfies a following conditional expression: $0.150 \leq T/L \leq 3.500$, where T is a minimum thickness of the light-shielding element along the optical axis, and L is a length of the at least one cut on the object-side mechanical surface or the image-side mechanical surface in an extension direction of the at least one cut from the inner-side surface toward the outer-side surface.

15. An optical imaging lens, comprising a plurality of lens elements and a light-shielding element configured to dispose in a lens barrel, wherein the light-shielding element comprises an object-side mechanical surface facing an object side, an image-side mechanical surface facing an image side, an inner-side surface facing an optical axis, and an outer-side surface facing away from the inner-side surface;

the light-shielding element further comprises at least one cut, wherein the at least one cut extends from the inner-side surface toward the outer-side surface and penetrates the object-side mechanical surface and the image-side mechanical surface;

the inner-side surface surrounds the optical axis and forms a through hole, a contour of the through hole has a shortest distance D1 passing through the optical axis and a longest distance D2 passing through the optical axis;

a periphery region of an image-side surface of a lens element in a first order counted from the light-shielding element to the object side among the lens elements is convex or a periphery region of an object-side surface of a lens element in a first order counted from the light-shielding element to the image side is convex, wherein the image-side surface is a surface of the lens element facing the image side and allowing imaging rays to pass through, and the object-side surface is a surface of the lens element facing the object side and allowing the imaging rays to pass through; and the optical imaging lens satisfies a following conditional expression: $0.100 \leq (D2-D1)/(D2+D1) \leq 0.950$.

16. The optical imaging lens according to claim 15, wherein the light-shielding element further comprises an elastic movable part, the elastic movable part has an inner edge closest to the optical axis, and the inner edge is a straight line.

17. The optical imaging lens according to claim 15, wherein the light-shielding element further satisfies a following conditional expression: $0.150 \leq T/L \leq 3.500$, where T is a minimum thickness of the light-shielding element along the optical axis, and L is a length of the at least one cut on the object-side mechanical surface or the image-side mechanical surface in an extension direction of the at least one cut from the inner-side surface toward the outer-side surface.

18. The optical imaging lens according to claim 15, wherein a reference plane comprising an extension line of the shortest distance D1 and the optical axis is defined, and an extension line of one of the at least one cut is parallel to the reference plane.

19. The optical imaging lens according to claim 15, wherein the light-shielding element further satisfies a following conditional expression: $1.500 \leq DS1/L \leq 25.000$, where DS1 is a distance from the inner-side surface to the outer-side surface at a position of the at least one cut in an extension direction of the at least one cut from the inner-side surface toward the outer-side surface, and L is a length of the at least one cut on the object-side mechanical surface or the image-side mechanical surface in an extension direction of the at least one cut from the inner-side surface toward the outer-side surface.

* * * * *